Sept. 6, 1955  R. R. HEDDEN  2,717,166
SELF ALIGNING, FLUID HANDLING SEALED SWIVEL CONNECTION
Filed April 24, 1950
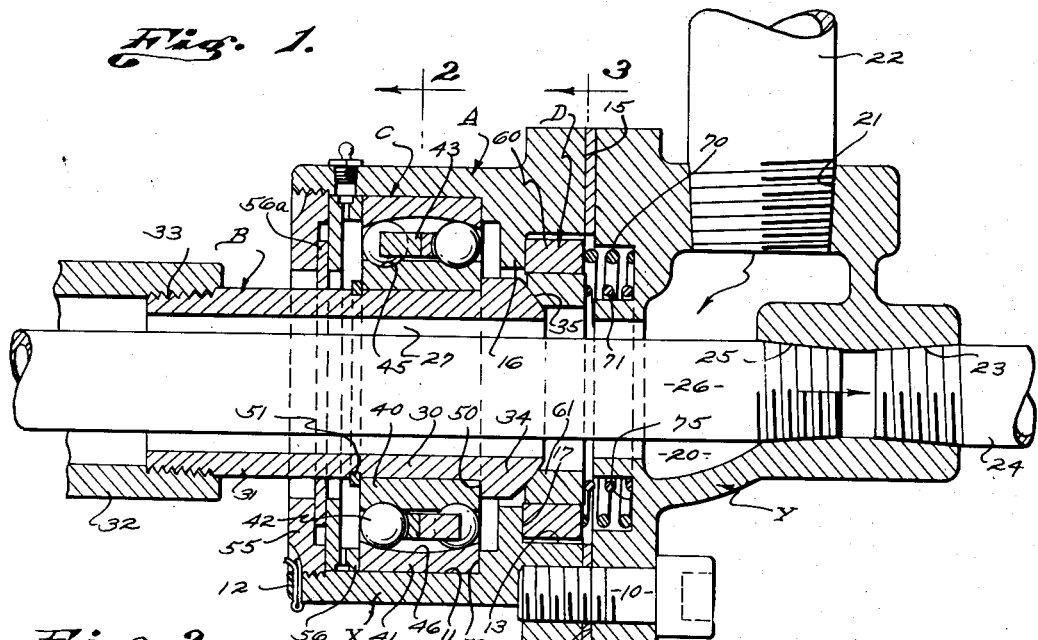
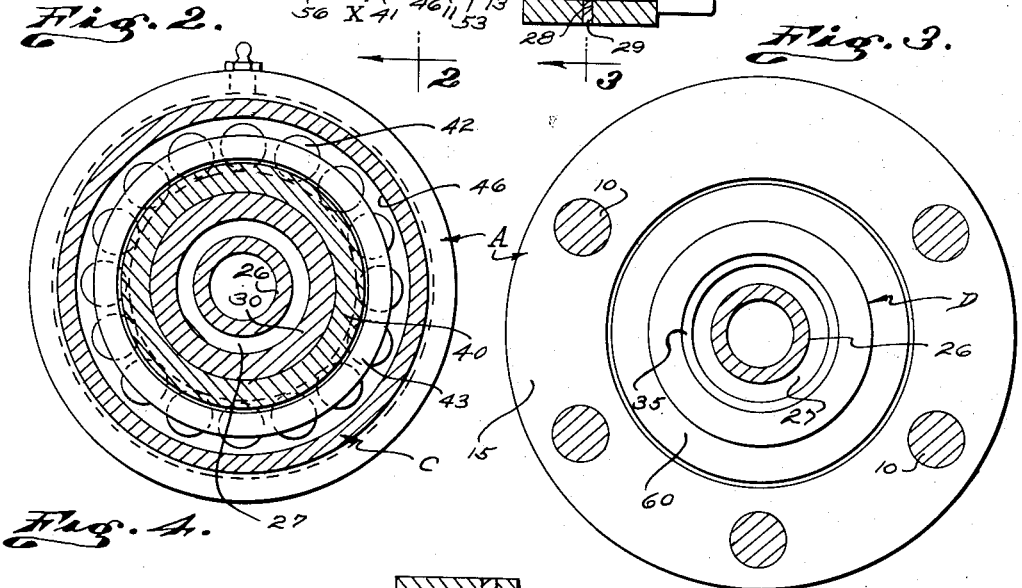
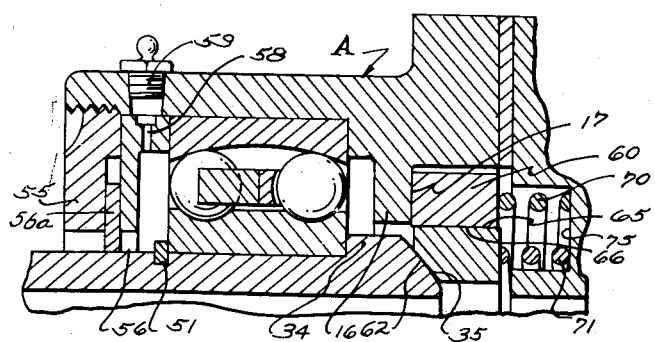
INVENTOR.
Robert R. Hedden
BY
Attorney

United States Patent Office 2,717,166
Patented Sept. 6, 1955

2,717,166

SELF ALIGNING, FLUID HANDLING SEALED SWIVEL CONNECTION

Robert R. Hedden, Fullerton, Calif., assignor to Chiksan Company, Brea, Calif., a corporation of California Application April 24, 1950, Serial No. 157,706

4 Claims. (Cl. 285—10)

This invention has to do with a swivel connection for handling fluids and it is a general object of the invention to provide a construction which permits the connected parts to shift or vary somewhat relative to each other as rotation occurs between the parts, and which is such as to handle fluids satisfactorily at high temperatures and under high pressures.

The structure embodying the present invention is characterized by two relatively movable members joined by an anti-friction bearing means and having sealing means acting to seal between the members as relative rotation occurs between them and as one member tilts or rocks to a limited extent relative to the other. One of the members is a female member formed of separable sections joined by releasable fasteners, one of the sections being a socket section with a socket opening in it from one end and a seal receiving opening extending into it from the other end and terminating at a flange. The other section of the female member is in the nature of a manifold with openings to its exterior suitable for the reception of pipes or the like, and in a preferred form one opening carries a laterally disposed fluid duct or pipe while the other carries an axial pipe and supports a central tubular duct that extends through the structure with clearance. The male member enters the socket opening of the female member and is provided at its inner end with an enlargement or head that has a spherically curved end face. The outer end portion of the male member projects from the female member and may be threaded or otherwise provided to receive a fluid conduit or the like.

The anti-friction bearing means couples the male and female members for relative rotation and for limited tilting or rocking movement relative to each other. In its preferred form the bearing means involves a double race ball bearing with an inner race ring on the inner portion of the male member, an outer race ring in the socket of the female member and two annular rows of balls between the race members. The balls are carried in annular grooves in the inner race and operate on or in engagement with the convexly curved single groove or recess in the outer race. The outer race is secured in the socket of the female member by a suitable retainer which also carries a packing that engages the male member and the inner race is retained on the male member between the head on the male member and a snap ring or the like applied to the male member.

The sealing means is carried in the socket section of the female member and involves two rigid sealing rings slidably fitted one within the other, the outer ring slidably seats against the flange in the socket section of the female member to rotate and shift radially thereon while the inner sealing ring has a spherically curved face that bears on and seats against the spherical face on the head of the male member. Separate compression springs engage the rings of the sealing member to hold them in light pressure or sealing engagement with the parts on which they bear.

It is a general object of this invention to provide a simple practical dependable structure effective for handling fluids at high temperatures and which is such that the male and female members of the structure are not only coupled for relative rotation but in such manner as to allow for limited rocking or tilting motion between them.

A further object of the invention is to provide a structure of the general character referred to involving a sealing means acting between the relatively rotatable sections which sealing means is of simple, practical, effective construction and involves relatively movable sealing rings, one cooperating with each of the relatively movable members.

A further object of the invention is to provide a joint construction of the general character referred to in which a retainer is provided in the outer or female member of the structure to hold a bearing element in place and to carry a sealing ring which engages the inner or male member.

It is a further object of the present invention to provide a joint construction of the general character referred to in which the relatively rotatable members of the structure are held together and allowed limited working or tilting movement relative to each other through a simple, dependable bearing that rotatably couples the members for relative rotation with a minimum of drag or friction.

The various objects and features of my invention will be fully understood from the following detailed description of a typical preferred form and application of the invention, throughout which description reference is made to the accompanying drawings, in which:

Fig. 1 is a longitudinal detailed sectional view of a structure embodying the present invention. Fig. 2 is a detailed transverse sectional view taken as indicated by line 2—2 on Fig. 1. Fig. 3 is a detailed transverse sectional view taken as indicated by line 3—3 on Fig. 1, and Fig. 4 is an enlarged view of a portion of the structure shown in Fig. 1.

The construction in which the present invention is involved includes, generally, two relatively movable members, a female member A and a male member B, anti-friction bearing means C coupling the members A and B for relative rotation and for limited tilting or working movement relative to each other, and sealing means D acting between the members A and B to provide a seal between the members.

The female member is preferably formed of two separable sections X and Y releasably connected or joined, as by suitable fasteners 10. The section X of the female member A is a socket section having an opening extending through it, the opening being formed, generally, by a socket 11 which enters the section X from its outer end 12 and a bore 13 which enters the section X from its inner end 15. A radially disposed inwardly projecting flange 16 occurs in the section X between the socket 11 and bore 13 and presents a flat radially disposed inwardly facing shoulder 17 which forms a bottom for the bore 13.

The section Y of the female member A is in the nature of a manifold forming a chamber 20 in communication with the section X and having a plurality of openings extending to its exterior and suitable for the reception of fluid handling ducts. In the particular case illustrated the manifold section Y has a lateral opening 21 receiving a laterally disposed duct or pipe 22 and it has a central or axial opening, the outer end portion 23 of which receives an axially disposed pipe 24. The inner portion 25 of the central or axial opening in the manifold section carries a central tubular duct 26 which extends through the joint construction with clearance. Through the construction just described the duct 26 is in communication with the pipe 24 while the pipe 22 is in communication with the chamber 20 and the annular flow handling space 27 that occurs between the interior of the male section B and the exterior of the duct 26.

The inner end 28 of the manifold section Y is flat and opposes the inner ends 15 of the socket section. In the drawings a suitable gasket or seal 29 is shown between the sections X and Y and the fasteners 10 are screw fasteners that connect the sections X and Y so that they can be separated when desired.

The male member B is an elongate tubular element the inner end portion 30 of which enters the socket section X of the female member while the outer end portion 31 projects from the end 12 of section X and may be such as to receive a suitable fluid conductor or pipe 32. In the case illustrated the male member is joined to the pipe 32 by a suitable threaded connection 33. In accordance with the present invention an enlargement or head 34 is provided on the inner end of the male member B and the head is characterized by a spherically curved end face 35.

The bearing means C is an anti-friction bearing coupling the members A and B against separation and for relative rotation and for limited tilting or rocking movement relative to each other. In the preferred form of the invention the bearing means C involves an inner race ring 40 carried on the inner portion 30 of member B, an outer race ring 41 carried in the socket opening 11 and two axially spaced rows of balls 42 held by a suitable spacer 43 and acting between the race rings 40 and 41. The inner race ring 40 has two axially spaced grooves or race-ways 45 carrying the balls 42 while the outer race ring 41 has a single concave race 46 against which the balls bear or on which the balls operate. Through this construction the bearing means C effectively couples the members A and B for relative rotation while at the same time allowing for a limited amount of rocking or tilting movement between the members. In accordance with the preferred form of the invention the center of curvature of the race-ways 46 in the outer ring 41 is coincidental with the central axis of the structure and with the center of curvature of the spherical face 35 of the head 34 of member B.

When the bearing means C is in operating position, as shown in Fig. 1, the inner race ring is seated against the shoulder 50 formed by the head 34 on member B and is retained by a split or snap ring 51 applied to the portion 30 of member B. The outer race ring 41 seats against a shoulder 53 in the member X at the bottom of the socket 11 and is retained by an annular retainer 55 threaded into the outer end portion of the socket opening. In the particular case illustrated the retainer is formed of an outer section threaded in the socket 11 and an inner section 56 which slidably fits the socket and bears against the race ring 41. A flat annular sealing ring 56a is slidably carried between the sections of the retainer to shift radially therebetween and has sealing engagement with the exterior of member B. The section 56 of the retainer has a suitable series of ports or passages 58 which conduct lubricant from a fitting 59 at the exterior of socket section X to the working parts of the bearing means C. The sealing means D involves two rigid concentric sealing rings one having sliding or shifting sealing engagement with the member A and the other having sliding sealing engagement with the member B. In the preferred form there is an outer sealing ring 60 that has sliding sealing or seated engagement on the shoulder 17 formed by the flange 16 and an inner sealing ring 61 which has a spherically curved face or seat 62 in sliding sealing engagement with the face 35 of head 34. The outer sealing ring 60 is substantially smaller in diameter than the bar 13, so that it is free to slide or shift radially on the shoulder 17, as clearly illustrated in the drawings. The rings 60 and 61 have sliding engagement, the inner ring 61 having a turned exterior 65 accurately fitted in a cylindrical bore or opening 66 through the ring 60. In practice the sealing rings may be formed of suitable metals or alloys and the rings fit together and against the parts which they engage to establish and maintain the desired seal between the members A and B. In accordance with the invention a helical compression spring 70 acts on or against the outer sealing ring 60 to normally hold it in suitable pressure engagement with shoulder 17 while a helical compression spring 71 acts on the inner sealing ring 61 to hold it in suitable pressure engagement with the head 34 of the member B. With the arrangement illustrated an annular spring receiving socket or counterbore 75 is provided in the inner face or end 28 of the manifold section Y to accommodate the springs in the manner clearly illustrated in Figs. 1 and 4 of the drawings. It is to be understood that the springs 70 and 71 need only exert sufficient pressure on the rings 60 and 61 to maintain them in working position in the structure and not with such pressure as would prevent relative shifting and rotation of the rings in the structure.

From the foregoing description it will be apparent that the present invention provides a swivel joint construction of simple construction and arrangement which is such as to effectively handle fluids at high temperatures. It is to be noted that the bearing means C not only holds the members A and B together, but connects them for relative rotation, and at the same time allows for a limited amount of working or pivotal movement about the center of curvature of the race in the outer sealing ring which is also the center about which the sealing faces 35 and 62 are formed. Through this construction, as the members A and B work relative to each other in the manner referred to above, and when they shift axially relative to each other, due to working clearance and/or as a result of wear, the seal between the members is not disturbed, but rather is free to shift axially and/or radially and continues to function and prevents leakage of fluid being handled by the structure.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A self aligning fluid handling swivel joint of the character described including, an elongate rigid tubular female member with a socket opening entering it from one end and a bore inward of the opening with a flat bottom the bore having a flat radially inwardly projecting annular shoulder therein spaced from and opposing the bottom of the bore, an elongate rigid tubular male member extending into the opening to terminate therein, anti-friction bearing means in the female member and rotatably and pivotally carrying the male member and including an outer ring releasably engaged in the socket opening, an inner ring releasably engaged on the male member, and axially spaced annular rows of balls between the rings, the inner ring having axially spaced grooves carrying the balls and the outer ring having a spherically curved concave race carrying the balls, the center of said concave race being coincidental with the central longitudinal axis of the joint, and axially and radially shiftable sealing means in said bore and sealing between the members, the sealing means including, an outer sealing ring in said bore, said outer ring being smaller in diameter than the base and having sliding sealing engagement with said shoulder and shiftable axially in the bore and on the shoulder, an outer compression spring between said outer ring and the bottom of the bore and yieldingly holding the ring against the shoulder, an inner sealing ring having sliding sealing engagement in the outer sealing ring and shiftable axially of the joint into sealing engagement with the male member, and an inner compression spring between the said inner ring and the bottom of the bore and yieldingly holding the said ring against the male member.

2. A self aligning fluid handling swivel joint of the character described including, an elongate rigid tubular female member with a socket opening entering it from one end and a bore inward of the socket opening and terminating at a flat bottom in the female section, a radially inwardly projecting annular flange in the bore having a flat radially disposed shoulder spaced from and opposing the bottom, an elongate rigid tubular male member extending into the opening to terminate therein and having an elongate spherically curved inner end face, bearing means in the female member and rotatably and pivotally carrying the male member and including an outer ring releasably engaged in the socket opening, an inner ring releasably engaged on the male member, and axially spaced annular rows of balls between the rings, the inner ring having axially spaced grooves carrying the balls and the outer ring having a spherically curved concave race carrying the balls, the center of said concave race being coincidental with the central longitudinal axis of the joint and with the center of curvature of the said end face, and radially and axially shiftable sealing means in said bore and sealing between the members, the sealing means including, an outer sealing ring in said bore and having sealing engagement with said shoulder, the outer ring being smaller in diameter than the bore and shiftable radially on the shoulder, an outer compression spring between said outer ring and the bottom of the bore and yieldingly holding the outer ring on the shoulder, an inner sealing ring slidably sealed in the outer sealing ring and shiftable axially of the joint and having a spherically curved complementary face having sealing engagement with the said end face of the male member, and an inner compression spring between the inner ring and the bottom of the bore and yieldingly holding the inner ring on the male member.

3. A self aligning fluid handling swivel joint of the character described including, a female member having separable sections, one section being a socket section with a socket opening entering it from its outer end and with a bore entering it from its inner end, there being an inwardly projecting annular flange in the socket section between and separating the socket opening and the bore, the flange having a flat radially disposed annular inwardly facing shoulder opposing the other section, said other section being a manifold section with fluid handling openings, screw means releasably securing the sections together with the manifold section covering the inner end of the socket section, a tubular fluid handling male member entering the socket opening to terminate therein, an anti-friction bearing releasably engaged in the socket opening and rotatably and pivotally supporting the male member, an annular retainer threaded into the socket opening and holding the bearing in the socket, a flat rigid annular sealing ring in the socket between the bearing and the retainer to shift radially relative thereto and engaging the male member to seal therewith, and sealing means between the members including an outer sealing ring in the bore sealing against the face of the shoulder, the outer ring smaller in diameter than the bore and shiftable radially on the shoulder, a spring between the outer sealing ring and the manifold section, an inner sealing ring slidable in the outer sealing ring and having sealing engagement with the outer ring and the inner end of the male member, and a spring between the inner sealing ring and the manifold section and located within the first mentioned spring.

4. A fluid handling swivel joint of the character described including, a tubular female member having an end portion with a socket entering it, the socket having a flat radially disposed inwardly facing shoulder therein, a rigid tubular male section having a portion in the socket with a spherically curved inner end face faced in the same direction as the shoulder, anti-friction bearing means between the said portion of the male section and the end portion of the female section coupling the sections for relative rotation on a common rotative axis, and sealing means in the socket and between the sections including, a rigid freely rotatable outer sealing ring with a flat end seated on the shoulder, a rigid freely rotatable inner sealing ring in sealed engagement within the outer ring and freely movable axially relative thereto, the outer sealing ring being smaller in outside diameter than the outside diameter of the shoulder face and shiftable radially thereon, the inner ring having a spherically curved recess in which said end face of the said portion of the male section is seated and sealed for rotation relative thereto, and an outer spring held in the female member and holding the outer ring in sealed engagement with the shoulder, and an inner spring held in the female member and holding the inner ring in sealed engagement with said spherical face.

References Cited in the file of this patent

UNITED STATES PATENTS

| Number | Name | Date |
|---|---|---|
| 927,403 | Cameron | July 6, 1909 |
| 1,346,523 | Bard | July 13, 1920 |
| 1,425,635 | Dod | Aug. 15, 1922 |
| 1,457,584 | McCuen | June 5, 1923 |
| 2,023,898 | Olson | Dec. 10, 1935 |
| 2,038,855 | Rosenblad | Apr. 28, 1936 |
| 2,220,771 | McHugh | Nov. 5, 1940 |
| 2,366,541 | Malkin | Jan. 2, 1945 |
| 2,385,421 | Monroe | Sept. 25, 1945 |
| 2,396,123 | Phillips | Mar. 5, 1946 |
| 2,462,006 | Schmitter et al. | Feb. 15, 1949 |
| 2,654,364 | Hertrich | Oct. 6, 1953 |